(12) United States Patent
Matsumoto

(10) Patent No.: US 8,689,175 B2
(45) Date of Patent: Apr. 1, 2014

(54) BUSINESS RULES MANAGEMENT SYSTEM

(75) Inventor: Kazuo Matsumoto, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 617 days.

(21) Appl. No.: 12/717,107

(22) Filed: Mar. 3, 2010

(65) Prior Publication Data
US 2011/0219355 A1   Sep. 8, 2011

(51) Int. Cl.
*G06F 9/44*   (2006.01)

(52) U.S. Cl.
USPC ............ 717/106; 717/107; 717/108; 717/109

(58) Field of Classification Search
None
See application file for complete search history.

(56) References Cited

U.S. PATENT DOCUMENTS

| | | | | |
|---|---|---|---|---|
| 5,555,169 A | * | 9/1996 | Namba et al. ................ | 704/9 |
| 5,584,026 A | * | 12/1996 | Knudsen et al. ................ | 1/1 |
| 5,586,329 A | * | 12/1996 | Knudsen et al. ............. | 717/108 |
| 5,586,330 A | * | 12/1996 | Knudsen et al. ............. | 717/136 |
| 5,594,899 A | * | 1/1997 | Knudsen et al. ............. | 1/1 |
| 5,596,752 A | * | 1/1997 | Knudsen et al. ............. | 717/117 |
| 5,682,535 A | * | 10/1997 | Knudsen ....................... | 717/117 |
| 6,257,774 B1 | * | 7/2001 | Stack ............................ | 717/110 |
| 6,523,172 B1 | * | 2/2003 | Martinez-Guerra et al. . | 717/143 |
| 2004/0088158 A1 | * | 5/2004 | Sheu et al. ................... | 704/9 |
| 2005/0149558 A1 | * | 7/2005 | Zhuk ........................ | 707/104.1 |
| 2006/0130048 A1 | * | 6/2006 | Ho et al. ...................... | 717/170 |
| 2007/0094638 A1 | * | 4/2007 | DeAngelis et al. .......... | 717/107 |
| 2009/0044096 A1 | * | 2/2009 | Gupta et al. ................. | 715/230 |
| 2009/0138258 A1 | * | 5/2009 | Neale ............................ | 704/9 |
| 2010/0031232 A1 | * | 2/2010 | Glazier et al. ............... | 717/106 |
| 2010/0077351 A1 | * | 3/2010 | Kaulgud et al. ............. | 715/810 |

FOREIGN PATENT DOCUMENTS

WO    WO 2008/054331    *    5/2008 ............. G06F 17/20

* cited by examiner

*Primary Examiner* — Henry Tsai
*Assistant Examiner* — Jing-Yih Shyu
(74) *Attorney, Agent, or Firm* — Schwegman Lundberg & Woessner, P.A.

(57) ABSTRACT

A system for generating and deploying rules in a business rule management system (BRMS) is described. An example system includes a communications module and a translator. The communications module may be configured to receive an input. The input may specify a rule expressed in a custom syntax. The translator may be configured to translate the rule expressed in the custom syntax into a translated rule. The translated rule may be in a form of a source code suitable for being compiled into an executable module.

10 Claims, 7 Drawing Sheets

```
package USA.MyRulePackage;

import com.ebay.rules.sample.RuleAppMetadata
import com.ebay.rules.sample.RuleMetadata;
import com.ebay.rules.sample.SaleRbo;
import com.ebay.rules.sample.PageRbo;
import com.ebay.rules.sample.ArgListRbo;
static import com.ebay.rules.sample.Categories.LaptopComputer;

@RuleAppMetadata(AppName = "MyRuleApp")                              — 610 public class SampleRule1 {

@RuleMetadata(
        fullyQualifiedName = "Sample Rule 1",                         — 620
        author = "kmatsumoto",
        usecase = "Selling",
        lastModificationDate = "11/22/2008 12:34"
    )

public final boolean MyRule1 (Object[] args) {
        SaleRbo itemRbo = ((ArgListRbo)args[0]).getItem();            — 630
        PageRbo pageRbo = ((ArgListRbo)args[0]).getPage();

if (itemRbo == null || pageRbo == null) {                     — 640
            return false;
        }
                                                                      — 650
        //BEGIN_RULE
        if (itemRbo.getStartPriceDouble() < 10 &&
            itemRbo.isListingCategory(LaptopComputer)) {
            pageRbo.setMessage("This is a great find – bid quickly!");
            return true;
        }
        //END_RULE
        return false;
    }
}
```

*FIG. 6*

BUSINESS RULES MANAGEMENT SYSTEM

TECHNICAL FIELD

This application relates to the technical fields of software and/or hardware technology and, in one example embodiment, to a business rules management system.

BACKGROUND

In general, a rule is a logical construct for describing the operations, definitions, conditions, and/or constraints that apply to some predetermined data to achieve a goal. Conventionally, business languages and business software (e.g., spreadsheets) may be expressed in terms of business rules. For example, in an application that determines mortgage qualification of an applicant, an age requirement may be expressed in a rule requiring the age of an applicant to be over eighteen.

Conventionally, a business rule management system (BRMS) broadly refers to a system that manages business rules that may be used by a business application. For example, one existing BRMS evaluates rules against data provided to a business application in order to determine whether the conditions of any of the rules are satisfied. If the conditions of a certain rule are satisfied by the data, the business application applies the rule. In some existing BRMS, the underlying software components (e.g., the rules repository, the rule authoring program, and the rule engine) are implemented using complex programming tools, which require knowledge of advanced programming languages, methods, and techniques.

BRIEF DESCRIPTION OF DRAWINGS

Embodiments of the present invention are illustrated by way of example and not limitation in the FIG.s of the accompanying drawings, in which like reference numbers indicate similar elements and in which:

FIG. 6 illustrates an example Java™ source code generated based on a rule defined utilizing custom syntax.

DETAILED DESCRIPTION

Figure 1:
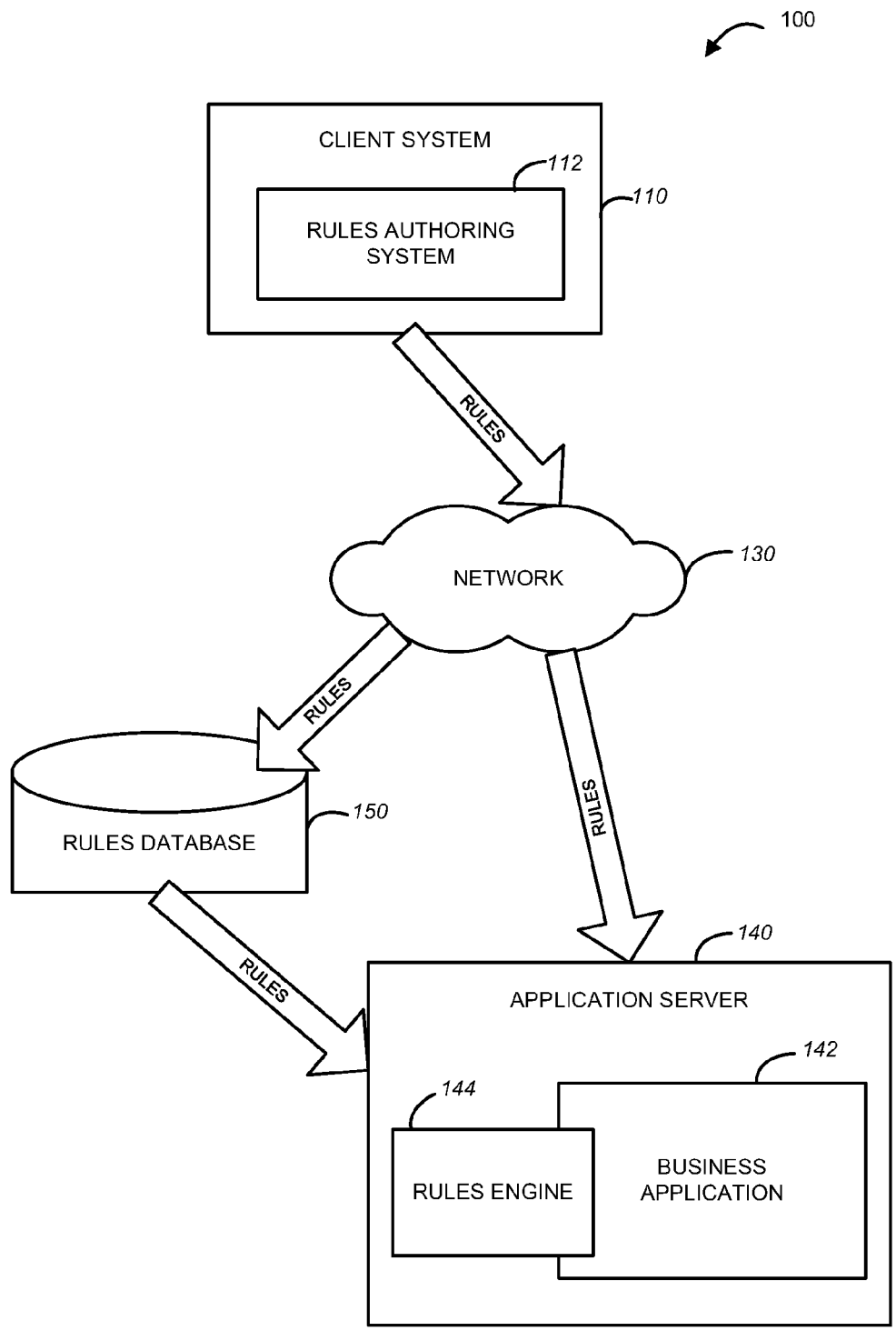
FIG. 1 is a diagrammatic representation of an architecture within which an example method and system for generating and deploying rules in a business rule management system may be implemented.

Described herein are some embodiments of a method and a system for generating and deploying rules in a business rule management system (BRMS). In one example embodiment, rules are authored using easy-to-understand business syntax but persisted as a source code expressed in a programming language that may be compiled into an executable code. The resulting executable code can then be consumed by a business rules engine (also referred to as rules engine) associated with a business application.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments of a BRMS implemented as a rule-based framework relate to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

As mentioned above, a business application may benefit from a business rules management system (BRMS) in processing data. A module within the BRMS framework configured to access business rules and to apply these rules to data may be termed a business rules engine. A business application may thus rely on a business rules engine to determine how to process certain tasks, requests, messages, etc. A business rules engine may be implemented, e.g., as a Java™ application embedded in the business application. Business rules that are maintained within the BRMS framework by the business rules engine may be created by business users (e.g., persons that may not necessarily possess computer programming skills) by means of a rules authoring system. A rules authoring system, in some embodiments, may be provided within the BRMS framework as a stand-alone application that may be installed on a computer system accessible to a business user.

In one example embodiment, the BRMS framework is itself rule driven, in that system rules utilized by a rule authoring system and by the business rules engine are constructed following the same principles as the business rules for processing business application data. Consequently, the BRMS framework can be improved to support new features with less advanced programming knowledge, which, in turn, may allows the BRMS framework to be improved more rapidly and with less disruption to existing applications.

A rule authoring system, that may contain a rules editor, may be provided to business users that may have very little or none at all programming skills. The rules authoring system is configured as a user-friendly computer application that permits users to construct business rules using easily understandable syntax that is close enough to natural language that it is usable by non-technical personnel. While the rules are presented to users is a business format (e.g., expressed using readily-understandable custom syntax), the authoring system may be configured to persist the rules in a form of a source code that can be compiled into an executable module.

In one example embodiment, a rule authored via an example rules authoring system is stored and deployed as a Java™ class containing a method that implements the rule. In other embodiments, a rule authored via an example rules authoring system may be stored and deployed as source code expressed in some other programming language. The rules authored via an example rules authoring system and stored as source code may be deployed for use by a business ruled engine associated with a business application. An example system for generating and deploying rules may be implemented in the context of a network environment as shown in FIG. 1.

FIG. 1 is a diagrammatic representation of an architecture 100 within which an example system for generating and deploying rules may be implemented. As shown in FIG. 1, the architecture 100 may include a client system 110 in communication with a server system (a production server 140) via a communications network 130. The communications network 130 may be a public network (e.g., the Internet, a wireless network, etc.) or a private network (e.g., a local area network (LAN), a wide area network (WAN), Intranet, etc.).

The client system 110 is shown as hosting a rules authoring system 112. The rules authoring system 112, in one example embodiment, may be utilized advantageously to permit uses to author business rules utilizing custom syntax. Custom syntax adapted for in the context of a business application may be referred to as business syntax. Thus authored rules may be translated into source code and stored in a rules database 150. The rules may also be deployed to a target runtime platform as Java™ fragments.

The target runtime platform for the rules authored via the rules authoring system 112, e.g., a business application 142 with its associated business rules engine 144 running on a production server 140, is Java™. The rules authoring system 112, in one example embodiment, also uses Java™ technology (e.g., provided as an embedded Java™ application) in order to minimize the gap between the rule authoring language and runtime Java™ language. As mentioned above, in one example embodiment, business rule language is provided by the rules authoring system 112 for authoring purposes to aid non-technical users. As mentioned above, the rules are persisted as Java™ source code. An example of a rule intended for use in the context of an on-line marketplace and expressed using a custom syntax is shown below in Table 1.

TABLE 1

```
rule MyRule1
if
    Item: Start Price < 10 and Item: Category is LaptopComputer
then
    Page: Display Message ("This is a great find - bid quickly!")
end
```

The rule presented in Table 1 can be easily understood as an instruction to display a certain message ("This is a great find—bid quickly!") if it is determined that the starting price for an laptop computer item has been set to less than $10. When a user who authored the rule shown above requests that the rule is saved, the rules authoring system 112 translates the statements expressed in the custom syntax into a source code (e.g., a Java™ class) that can be compiled into executable code, such that he rule is saved as a programming language source code.

The rule expressed in the custom syntax shown in Table 1 includes an object ("Item") and methods ("StartPrice", "Category is") and a parameter ("LaptopComputer") that is part of an expression ("Item: Start Price<10 and Item:Category is LaptopComputer"). The rule also includes a statement ("Page: Display Message ("This is a great find—bid quickly!") which consists of an object ("Page") and method ("Display Message") and parameter ("This is a great find—bid quickly!"). An example of the rule shown in Table 1 saved as a Java™ class is shown below in Table 2.

TABLE 2

```
package USA.MyRulePackage;
import com.ebay.rules.sample.RuleAppMetadata
import com.ebay.rules.sample.RuleMetadata;
import com.ebay.rules.sample.SaleRbo;
import com.ebay.rules.sample.PageRbo;
import com.ebay.rules.sample.ArgListRbo;
static import com.ebay.rules.sample.Categories.LaptopComputer;
@RuleAppMetadata(AppName = "MyRuleApp")
public class SampleRule1 {
    @RuleMetadata(
        fullyQualifiedName = "Sample Rule 1",
        author = "kmatsumoto",
        usecase = "Selling",
        lastModificationDate = "11/22/2008 12:34"
    )
    public final boolean MyRule1 (Object[ ] args) {
        SaleRbo itemRbo = ((ArgListRbo)args[0]).getItem( );
        PageRbo pageRbo = ((ArgListRbo)args[0]).getPage( );
        if (itemRbo == null || pageRbo == null) {
            return false;
        }
```

TABLE 2-continued

```
        //BEGIN_RULE
        if (itemRbo.getStartPriceDouble( ) < 10 &&
            itemRbo.isListingCategory(LaptopComputer)) {
                pageRbo.setMessage("This is a great find - bid
quickly!");
                return true;
        }
        //END_RULE
        return false;
    }
}
```

The source file shown in Table 2 above may be opened and edited in a standard programming language editor. For example, the Java™ editor such as Eclipse. Eclipse is the name of a multi-language software development environment. Java is a trademark of Oracle, Inc. As mentioned above, a rules engine consumes rules as executable modules (e.g., as Java™ bytecode). A business rule authored via a rules editor undergoes a transformation from a statement expressed in a custom syntax to a programming language source code to an executable module, as illustrated in FIG. 2.

Figure 2:
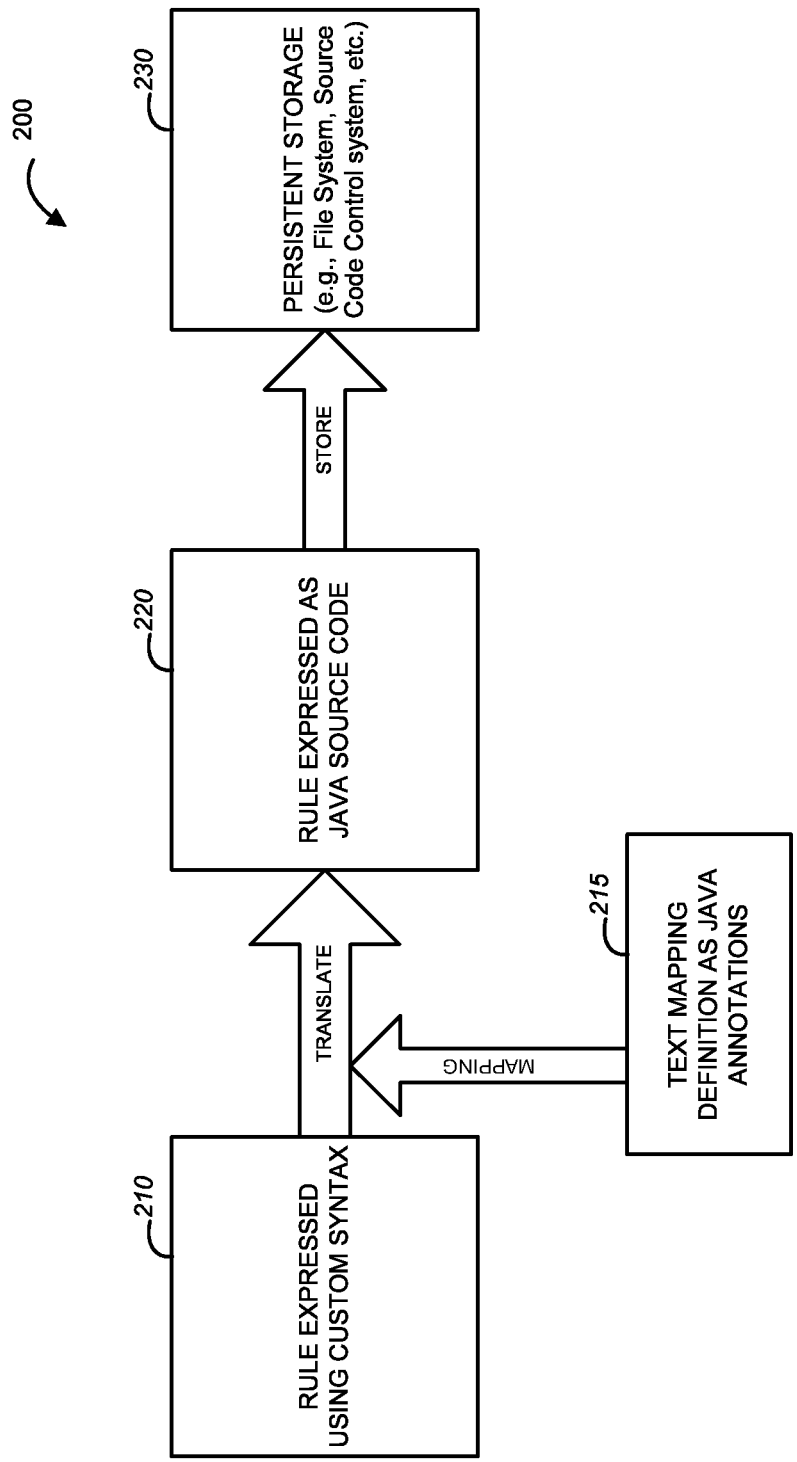
FIG. 2 is a diagrammatic representation of the transformation of a rule expressed using custom syntax into a rule expressed as Java™ source code in a rules editor.

FIG. 2 is a diagrammatic representation 200 of the transformation of a rule expressed using custom syntax (block 210) into a rule expressed as source code (block 220) and further into a rule in an executable format (block 230). The operation of translating a rule expressed using custom syntax into a rule expressed as source code (e.g., Java™ source code) may utilize (block 215) text mapping definitions that may be expressed as Java™ annotations. The source code associated with a rule initially authored utilizing custom syntax may be in the form of a Java™ class containing a method.

Figure 3:
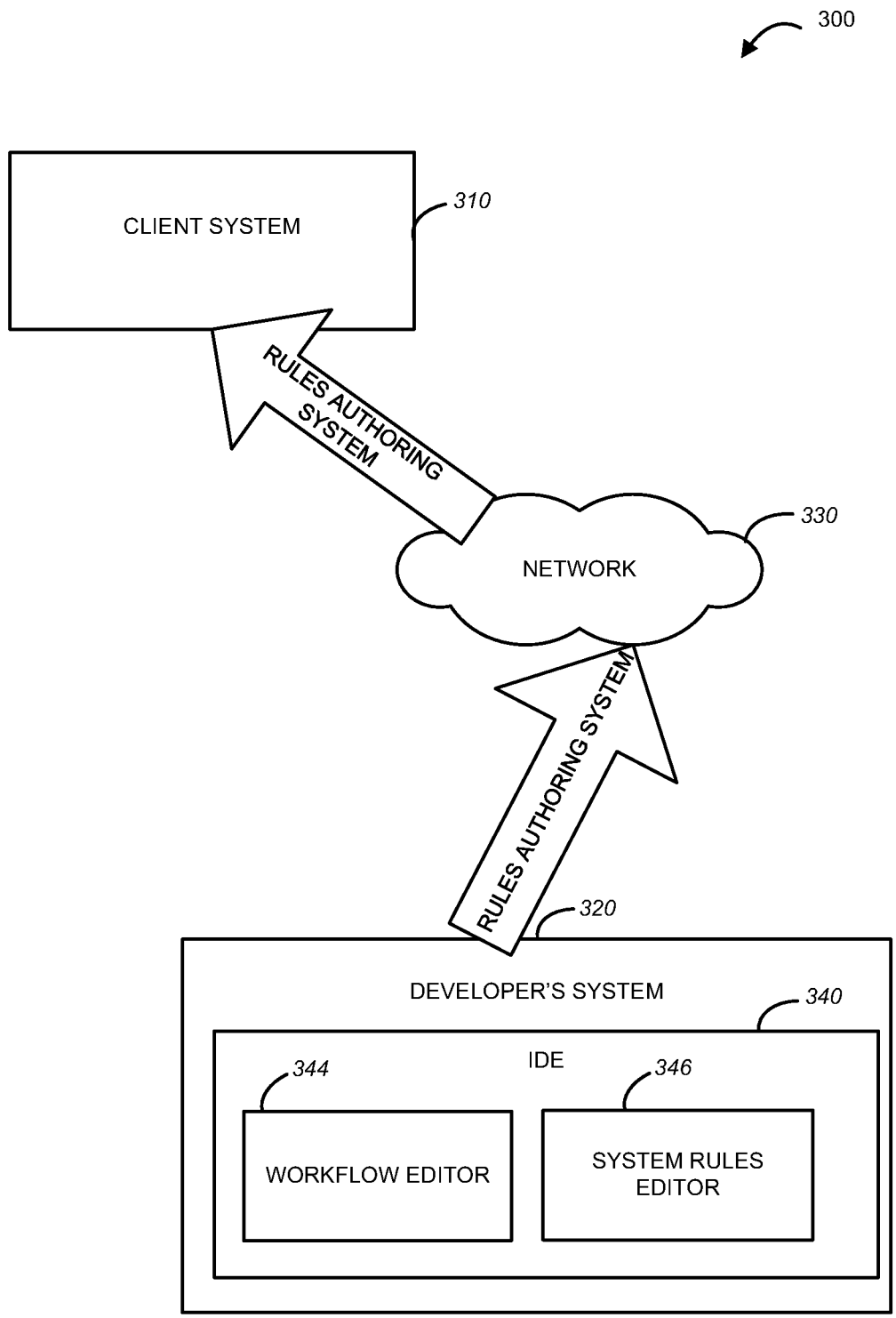
FIG. 3 is a diagrammatic representation of an architecture within which an example system for developing and customizing a rules authoring system may be implemented.

As mentioned above, a rules editor may exist in a form of a customized IDE. The customization of an IDE may be performed at a developer's computer system and provided to a client system for installation. FIG. 3 is a diagrammatic representation of an architecture 300 within which an example system for developing and maintaining a rules editor may be implemented. A rules editor intended for business users may be referred to as a business rules editor, to differentiate it from a system rules editor running on a developer's system. As shown in FIG. 3, the architecture 300 includes a client system 310 in communication with a developer's system 340 via a communications network 330. The communications network 330 may be a public network (e.g., the Internet, a wireless network, etc.) or a private network (e.g., a local area network (LAN), a wide area network (WAN), Intranet, etc.).

As shown in FIG. 3, the developer's system 320 hosts an IDE 340. The IDE 340 is configured to include a workflow editor 344 and a system rules editor 346. The workflow editor 344, in one example embodiment, is configured to permit a developer to specify the sequence for engaging various modules within a rules editor. The system rules editor 346, in one example embodiment, may be configured to add rules to services running as part of the business rules editor intended for the client system 110. As mentioned above, the system rules may be authored at the developer's system 320 using the custom syntax also utilized by business users running a rules editor on their respective client systems. A business rules editor may be developed at the developer's system 320, utilizing the IDE 340, and provided to the client system 310. An example business rules editor configured to convert rules authored using custom syntax into Java™ source code is described with reference to FIG. 4.

Figure 4:
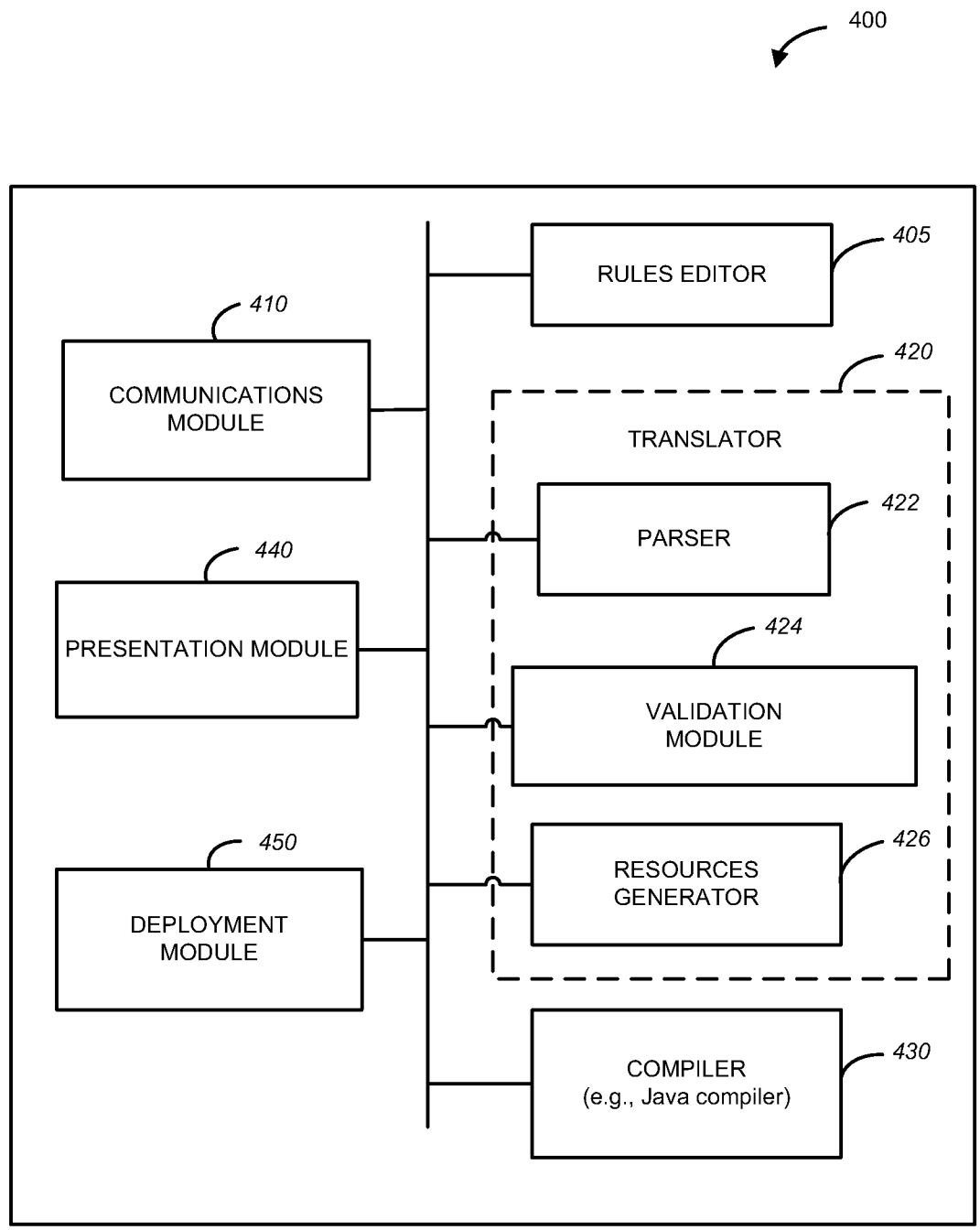
FIG. 4 is block diagram of an example rules authoring system, in accordance with one example embodiment.

FIG. 4 is block diagram of a rules authoring system 400, in accordance with one example embodiment. Various modules shown in FIG. 4 may reside on a client computer system and may be operating within an integrated development environment (IDE), such as, e.g., Eclipse®. The rules authoring system 400 may be configured at a developer's system, e.g., by customizing an IDE by adding a user interface (UI) that permits authoring and viewing of business rules using custom syntax (also referred to as business rules language).

As shown in FIG. 4, the rules authoring system 400 includes a rules editor 405, a communications module 410 and a translator 420. The rules editor 405 may be configured to permit a user to define business rules. The communications module 410 may be configured to receive an input initiated by a user. The input may specify a business rule expressed in a custom syntax. An example of a business rule expressed in a custom syntax is shown in Table 1 above, which was discussed earlier. The translator 420, in one example embodiment, may be configured to translate the rule expressed in the custom syntax into a source code suitable for being compiled into an executable module. An example of a Java™ class generated based on a business rule expressed using custom syntax is shown in Table 2 above, which was discussed earlier. In one example embodiment, a rule is translated into a Java™ class (or into a source code associated with some other programming language) in response to a request to save the rule. As shown in FIG. 4, the translator 420 may utilize some of the functionality of a parser 422, a validator 424, and a resource generator 426. The parser 422 may be configured to parse a rule expressed in the custom syntax. The validator 424 may be configured to validate parameters associated with the rule. This type of validation may be referred to as semantic validation. In one example embodiment, a rule authored using custom syntax comprises an "IF . . . THEN" statement, as well as metadata. Metadata may include information such as, e.g., a timestamp, author information, and information identifying a target application (e.g., in the context of an on-lime marketing system, a target application may be a buyer application or a seller application). Semantic validation may determine that certain parameters in a rule are invalid based on the value of a parameter and a target application specified in the rule's metadata. For example, certain information related to a buyer that appears in a rule targeted for a seller application may cause the validator 424 to identify the rule as invalid.

In some embodiments, validation rules may be created using custom syntax similar or identical to the syntax used for creating business rules, utilizing a system rules editor 346 shown in FIG. 3. The validator 424 may utilize a rules engine similar or identical to a rules engine used with a business application (e.g., the rules engine 144 shown in FIG. 1. An example of a validation rule expressed using custom syntax is shown below in Table 3.

TABLE 3

```
validation rule AuthorTooShort
if
        Rule: GetProperty("author"): Length <= 1
then
        Notifier: AddMessage("Property author is too short")
end
```

An example of a validation rule expressed using Java™ syntax is shown below in Table 4.

TABLE 4

```
public final boolean AuthorTooShortRule(Object[ ] args) {
  RuleRbo ruleRbo = ((RuleValidationArgListRbo)args[0]).getRuleRbo( );
  NotifierRbo notifierRbo =
((RuleValidationArgListRbo)args[0]).getNotifierRbo( );
  if (ruleRbo == null || notifierRbo == null) {
      return false;
  }
  //BEGIN_RULE
  if (ruleRbo.getProperty("author").length( ) <= 1) {
      notifierRbo.addMessage("Property author is too short", null);
      return true;
  }
  //END_RULE
  return false;
}
```

Returning to FIG. 4, the translator 420 may also include a resource generator 426. The resource generator 426 may be configured to extract resources associated with the rule. An example of a resource is keyword list. A user may wish to write a rule to perform a certain action when the item description contains any of the keywords specified in a keyword list. A keyword list may be made accessible from the rules authoring system 400 and also accessible to an associated runtime application server. The resource generator 426 is a module to process the resources into the format suitable for runtime. The resources associated with the rule may be provided by a business user or by another computing application.

The rules authoring system 400 further includes a programming language compiler 430 configured to compile the translated programming language source code into a compiled executable format (e.g., a Java™ bytecode). A deployment module 450, also shown in FIG. 4, may be configured to publish the compiled rule to a runtime environment, e.g., the business application 142 with its associated business rules engine 144 shown in FIG. 1. A presentation module 440 may be configured for presenting the rule expressed in the custom syntax to business users.

In one example embodiment, the rules authoring system 400 is configured to run its services (e.g., in the example embodiment of modules illustrated in FIG. 4) utilizing a workflow engine. A workflow engine is a software application configured to manage and execute modeled computer processes. Example operations performed by a rules editor are discussed with reference to FIG. 5.

Figure 5:
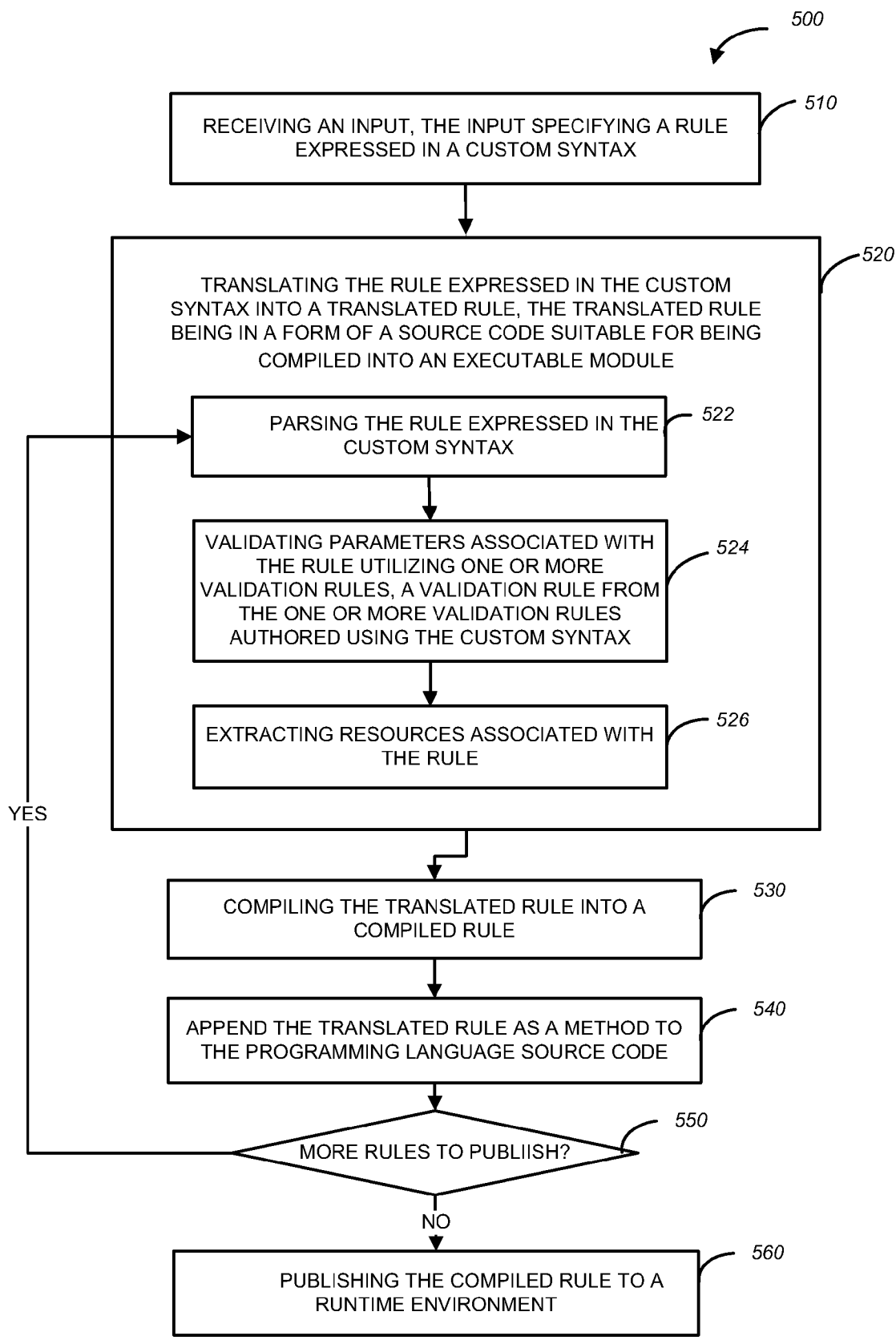
FIG. 5 is a flow chart illustrating a method for rule-based executable code generation and deployment workflow in a business rule management system, in accordance with an example embodiment.

FIG. 5 is a flow chart of a method 500 for authoring and persisting rules using a rules editor, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a client computer system (e.g., a client computer system 110 FIG. 1).

As shown in FIG. 5, the method 500 commences at operation 510, when the communications module 410 of FIG. 4 receives an input initiated by a user that specifies a business rule expressed in a custom syntax. At operation 520, the translator 420 of FIG. 4 translates the rule expressed in the custom syntax into a source code suitable for being compiled into an executable module. The source code is compiled at operation 530, the translated rule is appended as a method to the programming language source code at operation 540, and published to a runtime environment at operation 560 if it is determined at operation 550 that there are more rules to publish. As mentioned above, rules may be stored as source code (e.g., as Java™ classes or as source code associated with some other programming language, such as, e.g., C++).

As shown in FIG. 5, the translating operation 520 may include parsing the rule expressed in the custom syntax (operation 522), validating parameters associated with the rule (operation 524), and extracting resources associated with the rule (operation 526).

As explained above, the persistent format for a rule authored via a rules editor is a Java™ source file. Each source file, in one embodiment, is a Java™ class with one Java™ method which contains the if-then-end rule as Java™ "if" statement. The class name may be assigned by the rules editor, and the method name is the rule name defined in the rule header line. FIG. 6 illustrates an example source code 600 generated based on a rule defined utilizing custom syntax.

As shown in FIG. 6, the application name (in block 610), defined in the rule header line, may be added as TYPE annotation. The rule properties (in block 620), added on the Properties View, may be embedded as METHOD annotation. The rule name (in block 630), defined in the rule header, is used for the method name. Shown in block 640 is local variable definition for the rule body (block 650). If any of the objects defined as local variable is null, the method returns false without evaluating the body (block 650). The rule body (block 650) is surrounded by the BEGIN_RULE and END_RULE comments. These comments may be included to identify the "if" statement which is the real rule body from other "if" statements added in the code.

Figure 7:
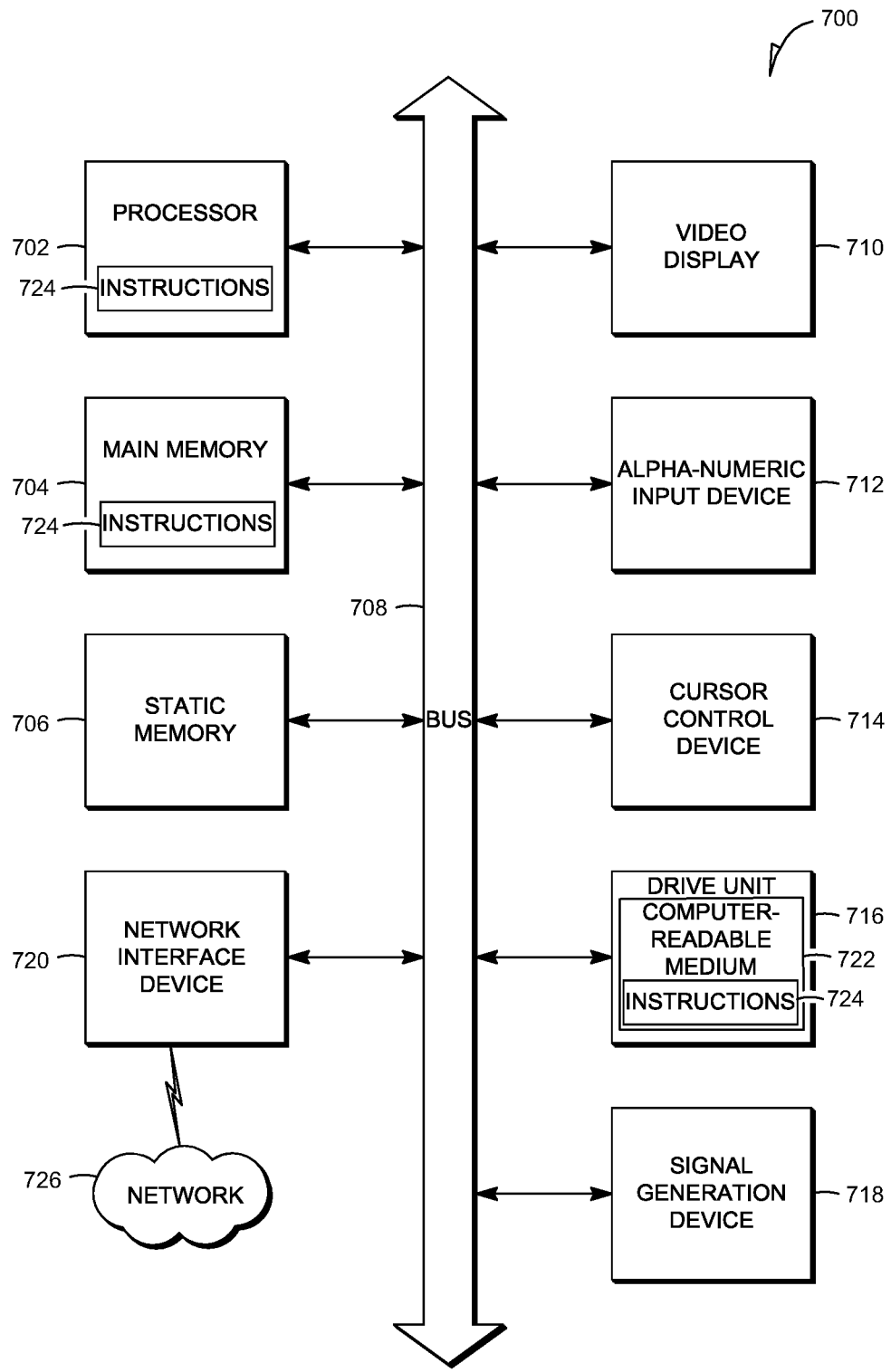
FIG. 7 is a diagrammatic representation of an example machine in the form of a computer system within which a set of instructions, for causing the machine to perform any one or more of the methodologies discussed herein, may be executed.

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a system for generating and deploying rules in a business rule management system (BRMS) has been described. Although the system has been described with reference to specific example embodiments, it will be evident that various modifications and changes may be made to these embodiments without departing from the broader spirit and scope of the inventive subject matter. Although various exemplary embodiments discussed herein focus on implementation on Java™-based servers and clients and related environments, the embodiments are given merely for clarity in disclosure. Thus, any type of server and client environment, based on an architecture-neutral programming language, including various system architectures, may employ various embodiments described herein. Accordingly, the specification and drawings are to be regarded in an illustrative rather than a restrictive sense.

What is claimed is:

1. A computer-implemented system comprising:
a communications module to receive an input, the input specifying a rule expressed in a custom syntax, the custom syntax provided by a rules authoring system; and
a translator to translate the rule expressed in the custom syntax into a translated rule, using at least one processor, the translated rule being in a form of a source code suitable for being compiled into an executable module, the translator comprising:
a parser to parse the rule expressed in the custom syntax,
a validator to utilize one or more validation rules to validate parameters associated with the rule, a validation rule from the one or more validation rules authored using the custom syntax, and
a resource generator to extract resources associated with the rule and to process the resources into a format suitable for a runtime environment, the resources comprising one or more keywords;
a compiler configured to compile the translated rule into a compiled rule; and
a deployment module to publish the compiled rule to the runtime environment.

2. The system of claim 1, wherein the translator is to translate the rule in response to a request to save the rule.

3. The system of claim 1, wherein the resources associated with the rule are provided by a source computing application.

4. The system of claim 1, wherein the runtime environment comprises a rules engine associated with a business application.

5. The system of claim 1, comprising a presentation module for presenting the rule expressed in the custom syntax to a viewer.

6. A computer-implemented method comprising:
using one or more processors to perform operations of:
receiving an input, the input specifying a rule expressed in a custom syntax, the custom syntax provided by a rules authoring system; and
translating the rule expressed in the custom syntax into a translated rule, the translated rule being in a form of a source code suitable for being compiled into an executable module, the translating of the rule comprising:
parsing the rule expressed in the custom syntax,
utilizing one or more validation rules to validate parameters associated with the rule, a validation rule from the one or more validation rules authored using the custom syntax,
extracting resources associated with the rule, and
processing the resources into a format suitable for a runtime environment, the resources comprising one or more keywords;
compiling the translated rule into a compiled rule; and
publishing the compiled rule to the runtime environment.

7. The method of claim 6, wherein the translating of the rule is in response to a request to save the rule.

8. The method of claim 6, wherein the resources associated with the rule are provided by a source computing application.

9. The method of claim 6, wherein the runtime environment comprises a rules engine associated with a business application.

10. A non-transitory machine-readable medium having instruction data to cause a machine to:
receive an input, the input specifying a rule expressed in a custom syntax, the custom syntax provided by a rules authoring system;
parse the rule expressed in the custom syntax;
utilize one or more validation rules to validate parameters associated with the rule, a validation rule from the one or more validation rules authored using the custom syntax;
extract resources associated with the rule and to process the resources into a format suitable for a runtime environment, the resources comprising one or more keywords;
translate the rule expressed in the custom syntax into a translated rule, the translated rule being in a form of a source code suitable for being compiled into an executable module;
compile the translated rule into a compiled rule; and
publish the compiled rule to the runtime environment.

* * * * *

UNITED STATES PATENT AND TRADEMARK OFFICE
CERTIFICATE OF CORRECTION

PATENT NO.       : 8,689,175 B2
APPLICATION NO. : 12/717107
DATED            : April 1, 2014
INVENTOR(S)      : Kazuo Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this
Thirtieth Day of May, 2017

Michelle K. Lee
*Director of the United States Patent and Trademark Office*